United States Patent
Milsom et al.

(10) Patent No.: US 12,008,766 B2
(45) Date of Patent: Jun. 11, 2024

(54) IMAGE PROCESSING TO DETECT EDGES, WALLS, AND SURFACES FOR A VIRTUAL PAINTING APPLICATION

(71) Applicant: Behr Process Corporation, Santa Ana, CA (US)

(72) Inventors: Douglas Milsom, Tacoma, WA (US); Un Ho Chung, Santa Ana, CA (US); Michael Askew, Chicago, IL (US); Kiki Takakura-Merquise, San Mateo, CA (US)

(73) Assignee: Behr Process Corporation, Santa Ana, CA (US)

( * ) Notice: Subject to any disclaimer, the term of this patent is extended or adjusted under 35 U.S.C. 154(b) by 0 days.

(21) Appl. No.: 18/225,714

(22) Filed: Jul. 25, 2023

(65) Prior Publication Data
US 2024/0037753 A1 Feb. 1, 2024

Related U.S. Application Data

(60) Provisional application No. 63/392,345, filed on Jul. 26, 2022.

(51) Int. Cl.
*G06K 9/48* (2006.01)
*G06T 3/40* (2006.01)
(Continued)

(52) U.S. Cl.
CPC ............. *G06T 7/13* (2017.01); *G06T 3/40* (2013.01); *G06T 7/0002* (2013.01); *G06T 7/50* (2017.01);
(Continued)

(58) Field of Classification Search
CPC .... G06T 7/13; G06T 3/40; G06T 7/50; G06T 2207/20044; G06T 2207/20132;
(Continued)

(56) References Cited

U.S. PATENT DOCUMENTS

| 9,123,174 B2 | 9/2015 | Behrens et al. |
| 9,190,016 B2 | 11/2015 | Lapinski |

(Continued)

FOREIGN PATENT DOCUMENTS

| CN | 112116620 A | 12/2020 |
| WO | WO-2021072162 A1 | 4/2021 |
| WO | WO-2022098477 A1 | 5/2022 |

OTHER PUBLICATIONS

"Holistically-Nested Edge Detection with OpenCV and Deep Learning," Adrian Rosebrock, pyimagesearch.com, Mar. 4, 2019; Retrieved from: <URL: https://pyimagesearch.com/2019/03/04/holistically-nested-edge-detection-with-opencv-and-deep-learning/>, pp. 1-16; and figure 1.

(Continued)

*Primary Examiner* — Duy M Dang
(74) *Attorney, Agent, or Firm* — Harness, Dickey & Pierce, P.L.C.

(57) ABSTRACT

A method for enabling a user to paint an image uploaded to a device is provided. The method includes uploading an image to the device, performing a depth estimation on the image to generate a depth map, and performing an edge detection on the image to generate a first edge map. The method also includes performing the edge detection on the depth map to generate a second edge map, performing a skeletonization function on the first edge map to generate a third edge map, and performing the skeletonization function on the depth map to generate a fourth edge map. The method also includes generating a final edge map using the third edge map and the fourth edge map, generating a colorized image by applying color to the final edge map to paint at least one wall of a scene, and displaying the colorized image on a display of the device.

40 Claims, 7 Drawing Sheets

(51) Int. Cl.
  *G06T 7/00* (2017.01)
  *G06T 7/13* (2017.01)
  *G06T 7/50* (2017.01)
  *G06V 10/46* (2022.01)
  *G06V 10/56* (2022.01)
(52) U.S. Cl.
  CPC .............. *G06V 10/46* (2022.01); *G06V 10/56* (2022.01); *G06T 2207/20044* (2013.01); *G06T 2207/20132* (2013.01); *G06T 2207/30168* (2013.01)
(58) Field of Classification Search
  CPC ......... G06T 7/0002; G06T 2207/30168; G06T 5/005; G06V 10/46; G06V 10/56; G06V 10/44; G06V 30/1801; G06V 10/34; G06V 30/168; G06R 5/30
  USPC .................................. 382/199, 254, 258, 259
  See application file for complete search history.

(56) References Cited

U.S. PATENT DOCUMENTS

| | | | |
|---|---|---|---|
| 10,304,125 B1 | 5/2019 | Huisenga et al. | |
| 10,387,938 B2 | 8/2019 | Miller et al. | |
| 10,416,790 B2 * | 9/2019 | Reynolds | G06T 7/12 |
| 10,496,244 B2 | 12/2019 | Reynolds et al. | |
| 10,809,884 B2 | 10/2020 | Vickers et al. | |
| 10,956,784 B2 | 3/2021 | Gray et al. | |
| 11,158,091 B2 | 10/2021 | Panetta et al. | |
| 11,244,170 B2 | 2/2022 | Zhang | |
| 2003/0151611 A1 | 8/2003 | Turpin et al. | |
| 2015/0235389 A1 | 8/2015 | Miller et al. | |
| 2016/0275702 A1 * | 9/2016 | Reynolds | G06T 7/12 |
| 2017/0132769 A1 | 5/2017 | Barron et al. | |
| 2018/0156663 A1 | 6/2018 | Farley et al. | |
| 2020/0372694 A1 | 11/2020 | Hwang et al. | |
| 2020/0393917 A1 | 12/2020 | Reynolds et al. | |
| 2021/0142577 A1 | 5/2021 | Thomas et al. | |
| 2021/0406974 A1 | 12/2021 | Minchew et al. | |

OTHER PUBLICATIONS

"Holistically-Nested Edge Detection," Saining Xie et al., arXiv:1504.06375vl, pp. 1-9, Apr. 24, 2015.

International Search Report and Written Opinion of the ISA issued in PCT/US2023/028631, dated Nov. 8, 2023; ISA/US.

Holistically-Nested Edge Detection, Saining Xie, retrieved from <URL: https://arxiv.org/abs/1504.06375vl>, pp. 1-8; and figure 6, Apr. 2016.

* cited by examiner

IMAGE PROCESSING TO DETECT EDGES, WALLS, AND SURFACES FOR A VIRTUAL PAINTING APPLICATION

CROSS-REFERENCE TO RELATED APPLICATIONS

This application claims the benefit of U.S. Provisional Application No. 63/392,345, filed on Jul. 26, 2022. The entire disclosure of the above application is incorporated herein by reference.

FIELD

The present disclosure relates to systems and methods of image processing to detect edges, walls, and surfaces within an uploaded image of a room and to virtually paint the room based on the detected edges, walls, and surfaces.

BACKGROUND

This section provides background information related to the present disclosure which is not necessarily prior art.

Retail stores offering paint often have a plethora of sample cards positioned in a display to represent the number of paint colors available. However, selecting a paint color from the available paint colors can be a challenging task for a customer. For example, the customer may desire to match the paint color with furniture, flooring, window treatments, and/or decorations of an interior space.

More specifically, it is often difficult for a customer to visualize a wall of the interior space with a new paint color. In one approach, the customer may retrieve one or more sample cards from the retail store and tape the sample cards to the wall of the interior space. In another approach, the customer may purchase a small amount of paint in one or more colors and paint a portion of the wall of the interior space. However, these approaches are found to be time consuming, costly, and still leave the customer without a clear picture of what the interior space will look like with the new paint color.

Existing systems and methods for virtually painting an image of a room do not provide high-definition demarcation of the edges, walls, and surfaces within the image and are prone to have blurring at the edges and unpainted spaces between walls, corners, edges, etc.

SUMMARY

This section provides a general summary of the disclosure and is not a comprehensive disclosure of its full scope or all of its features.

The present disclosure provides a method for enabling a user to paint an image uploaded to a device. The method includes uploading an image to the device, where the image is of a scene having at least one wall. The method also includes performing a depth estimation on the image to generate a depth map. The method also includes performing an edge detection on the image to generate a first edge map, where the first edge map includes a first set of edge lines of the scene outlining the at least one wall. The method also includes performing the edge detection on the depth map to generate a second edge map, where the first edge map includes a second set of edge lines of the scene. The method also includes performing a skeletonization function on the first edge map to generate a third edge map, where the skeletonization function thins a width of each edge line in the first set of edge lines. The method also includes performing the skeletonization function on the depth map to generate a fourth edge map. The method also includes generating a final edge map using the third edge map and the fourth edge map, generating a colorized image by applying color to the final edge map to paint the at least one wall, and displaying the colorized image on a display of the device.

In some configurations, the method also includes validating the image before performing the depth estimation, where the validating includes determining whether the image meets a threshold for image quality.

In some configurations, the method also includes adjusting the image before performing the depth estimation, where the adjusting includes at least one of cropping the image, modifying an angle of the image, zooming in or out of the image, and modifying a placement of the image.

In some configurations, the method also includes scaling the image before performing the depth estimation, where scaling includes adjusting a resolution of the image to a maximum resolution.

In some configurations, the maximum resolution is one of 1600 pixels by 900 pixels or 900 pixels by 1600 pixels.

In some configurations, performing the edge detection includes performing a raw holistically-nested edge detection (HED).

In some configurations, the method also includes performing a canny edge detection on the image to generate a fifth edge map, performing the canny edge detection on a saturation channel of the image to generate a sixth edge map, and generating the final edge map using the third, fourth, fifth and sixth edge maps.

In some configurations, the method also includes down-sampling the image to generate a down-sampled image, performing a canny edge detection on the down-sampled image to generate an edge map, up-sampling the edge map to generate an up-sampled edge map, performing the skeletonization function on the up-sampled edge map to generate a seventh edge map, and generating the final edge map using the third, fourth, and seventh edge maps.

In another form, the present disclosure provides a method for enabling a user to paint an image uploaded to a device. The method includes uploading an image to the device, where the image is of a scene having at least one wall. The method also includes performing a depth estimation on the image to generate a depth map. The method also includes performing a first edge detection on the image to generate a first edge map, where the first edge map includes a first set of edge lines of the scene outlining the at least one wall. The method also includes performing the first edge detection on the depth map to generate a second edge map, where the second edge map includes a second set of edge lines of the scene. The method also includes performing a skeletonization function on the first edge map to generate a third edge map, where the skeletonization function thins a width of each edge line in the first set of edge lines. The method also includes performing the skeletonization function on the depth map to generate a fourth edge map. The method also includes performing a second edge detection on the image to generate a fifth edge map and performing the second edge detection on a saturation channel of the image to generate a sixth edge map. The method also includes generating a final edge map using the third edge map, the fourth edge map, the fifth edge map, and the sixth edge maps, generating a colorized image by applying color to the final edge map to paint the at least one wall, and displaying the colorized image on a display of the device.

In some configurations, performing the first edge detection includes performing a raw holistically-nested edge detection (HED).

In some configurations, performing the second edge detection includes performing a canny edge detection.

In some configurations, the method also includes measuring a first value of a brightness and a second value of a contrast of the image, and balancing a color of the image using the first and second values.

In some configurations, the method also includes down-sampling the image to generate a down-sampled image, performing a canny edge detection on the down-sampled image to generate an edge map, up-sampling the edge map to generate an up-sampled edge map, performing the skeletonization function on the up-sampled edge map to generate a seventh edge map, and generating the final edge map using the third, fourth, fifth, sixth, and seventh edge maps.

In another form, the present disclosure provides a method for enabling a user to paint an image uploaded to a device. The method includes uploading an image to the device, where the image is of a scene having at least one wall and the scene includes at least one shadow and at least one highlight. The method also includes performing a depth estimation on the image to generate a depth map and performing an edge detection on the image to generate an edge map, where the edge map includes an outline of the at least one wall. The method also includes generating a final edge map using the depth map and the edge map. The method also includes performing a grayscale function on the image to generate a grayscale image. The method also includes performing a transparency function on the image to generate an alpha gray image, where the alpha gray image represents the at least one shadow as an opaque region and represents the at least one highlight as a transparent region. The method also includes performing a normalization function on the image to generate a re-gray image, where the normalization function includes measuring one or more values of at least one pixel of the image and normalizing the one or more values. The method also includes generating a colorized image by applying a color to the final edge map and using the grayscale image, alpha gray image and re-gray image. The method also includes displaying the colorized image on a display of the device.

In some configurations, the grayscale function includes gray scaling the image to generate a preliminary grayscale image and adjusting a value of at least one pixel of the preliminary grayscale image to generate the grayscale image.

In some configurations, the normalization function further includes determining a dominant color value of the image and the value includes a color value, where normalizing the color values of image uses the dominant color value.

In some configurations, the normalization function further includes detecting a contour in the image and the at least one pixel represents pixels of the contour.

In some configurations, the one or more values include a brightness value and a contrast value.

In some configurations, generating the colorized image includes applying a color on top of the alpha gray image.

In some configurations, generating the colorized image includes applying a color below the alpha gray image.

In another form, the present disclosure provides a system comprising a computing device having a processor and a memory. The computing device is configured to receive an image uploaded to the computing device, where the image is of a scene having at least one wall. The computing device is also configured to perform a depth estimation on the image to generate a depth map and perform an edge detection on the image to generate a first edge map, where the first edge map includes a first set of edge lines of the scene outlining the at least one wall. The computing device is also configured to perform the edge detection on the depth map to generate a second edge map, where the first edge map includes a second set of edge lines of the scene. The computing device is also configured to perform a skeletonization function on the first edge map to generate a third edge map, where the skeletonization function thins a width of each edge line in the first set of edge lines. The computing device is also configured to perform the skeletonization function on the depth map to generate a fourth edge map. The computing device is also configured to generate a final edge map using the third edge map and the fourth edge map, generate a colorized image by applying color to the final edge map to paint the at least one wall, and display the colorized image on a display of the computing device.

In some configurations, the computing device is further configured to validate the image before performing the depth estimation, where the validating includes determining whether the image meets a threshold for image quality.

In some configurations, the computing device is further configured to adjust the image before performing the depth estimation, where the adjusting includes at least one of cropping the image, modifying an angle of the image, zooming in or out of the image, and modifying a placement of the image.

In some configurations, the computing device is further configured to scale the image before performing the depth estimation, where the scaling includes adjusting a resolution of the image to a maximum resolution.

In some configurations, the maximum resolution is one of 1600 pixels by 900 pixels or 900 pixels by 1600 pixels.

In some configurations, the computing device is further configured to perform the edge detection by performing a raw holistically-nested edge detection (HED).

In some configurations, the computing device is further configured to perform a canny edge detection on the image to generate a fifth edge map, perform the canny edge detection on a saturation channel of the image to generate a sixth edge map, and generate the final edge map is using the third, fourth, fifth and sixth edge maps.

In some configurations, the computing device is further configured to down-sample the image to generate a down-sampled image, perform a canny edge detection on the down-sampled image to generate an edge map, up-sample the edge map to generate an up-sampled edge map, perform the skeletonization function on the up-sampled edge map to generate a seventh edge map, and generate the final edge map is using the third, fourth, and seventh edge maps.

In another form, the present disclosure provides a system comprising a computing device having a processor and a memory. The computing device is configured to receive an image uploaded to the computing device, where the image is of a scene having at least one wall. The computing device is also configured to perform a depth estimation on the image to generate a depth map. The computing device is also configured to perform a first edge detection on the image to generate a first edge map, where the first edge map includes a first set of edge lines of the scene outlining the at least one wall. The computing device is also configured to perform the first edge detection on the depth map to generate a second edge map, where the second edge map includes a second set of edge lines of the scene. The computing device is also configured to perform a skeletonization function on the first edge map to generate a third edge map, where the skeletonization function thins a width of each edge line in the first set of edge lines. The computing device is also configured to perform the skeletonization function on the depth map to generate a fourth edge map. The computing device is also configured to perform a second edge detection on the image to generate a fifth edge map and perform the second edge detection on a saturation channel of the image to generate a sixth edge map. The computing device is also configured to generate a final edge map using the third edge map, the fourth edge map, the fifth edge map, and the sixth edge maps, generate a colorized image by applying color to the final edge map to paint the at least one wall, and display the colorized image on a display of the computing device.

In some configurations, the computing device is further configured to perform the first edge detection by performing a raw holistically-nested edge detection (HED).

In some configurations, the computing device is further configured to perform the second edge detection by performing a canny edge detection.

In some configurations, the computing device is further configured to measure a first value of a brightness and a second value of a contrast of the image, and to balance a color of the image using the first and second values.

In some configurations, the computing device is further configured to down-sample the image to generate a down-sampled image, perform a canny edge detection on the down-sampled image to generate an edge map, up-sample the edge map to generate an up-sampled edge map, perform the skeletonization function on the up-sampled edge map to generate a seventh edge map, and generate the final edge map using the third, fourth, fifth, sixth, and seventh edge maps.

In another form, the present disclosure provides a system comprising a computing device having a processor and a memory. The computing device is configured to receive an image uploaded to the computing device, where the image is of a scene having at least one wall and the scene includes at least one shadow and at least one highlight. The computing device is also configured to perform a depth estimation on the image to generate a depth map. The computing device is also configured to perform an edge detection on the image to generate an edge map, where the edge map includes an outline of the at least one wall. The computing device is also configured to generate a final edge map using the depth map and the edge map. The computing device is also configured to perform a grayscale function on the image to generate a grayscale image. The computing device is also configured to perform a transparency function on the image to generate an alpha gray image, where the alpha gray image represents the at least one shadow as an opaque region and represents the at least one highlight as a transparent region. The computing device is also configured to perform a normalization function on the image to generate a re-gray image, where the normalization function includes measuring one or more values of at least one pixel of the image and normalizing the one or more values. The computing device is also configured to generate a colorized image by applying a color to the final edge map and using the grayscale image, alpha gray image and re-gray image, and display the colorized image on a display of the computing device.

In some configurations, the computing device is further configured to perform the grayscale function by gray scaling the image to generate a preliminary grayscale image and to adjust a value of at least one pixel of the preliminary grayscale image to generate the grayscale image.

In some configurations, the computing device is further configured to perform the normalization function further by determining a dominant color value of the image and the value includes a color value, where normalizing the color values of image uses the dominant color value.

In some configurations, the computing device is further configured to perform the normalization function further by detecting a contour in the image, and the at least one pixel represents pixels of the contour.

In some configurations, the one or more values include a brightness value and a contrast value.

In some configurations, the computing device is further configured to generate the colorized image includes by applying a color on top of the alpha gray image.

In some configurations, the computing device is further configured to generate the colorized image includes applying a color below the alpha gray image.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure provides a paint your place application that allows the customer to digitally visualize an interior space with a new paint color applied to one or more walls of the interior space. More specifically, the present disclosure provides an advanced recipe for the paint your place application that minimizes the number of inputs required by the customer for an efficient and reliable method for visualizing the interior space with the new paint color.

Figure 1:
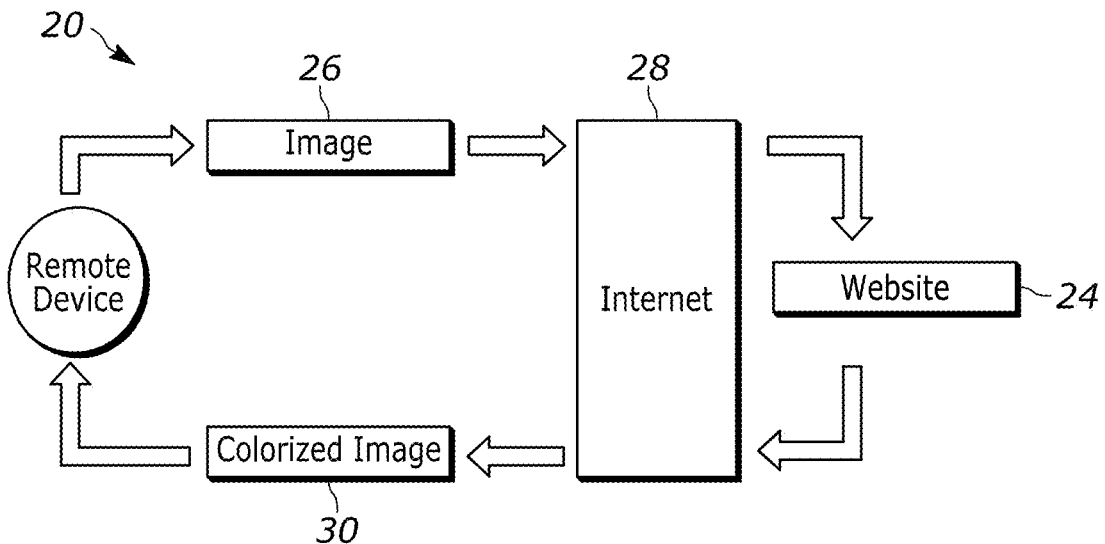
FIG. 1 is a schematic diagram of a system operating a plaint your place application according to the principles of the present disclosure.
Figure 2:
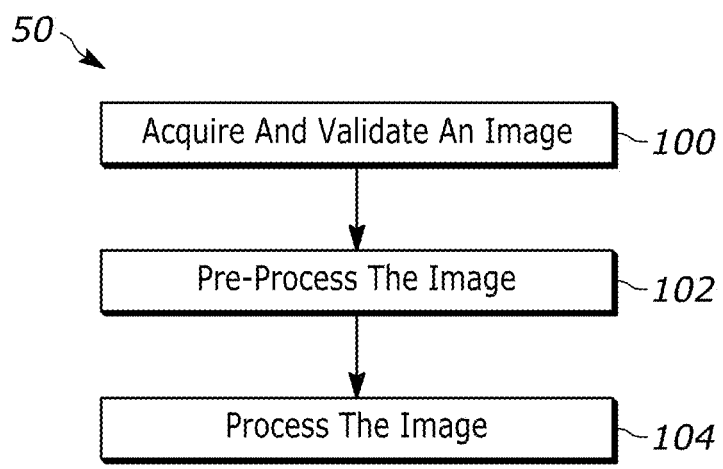
FIG. 2 is a flow chart of a method for executing the paint your place application.

With reference to FIGS. 1-14, a paint your place application is provided that performs image processing to detect edges, walls, and surfaces within an uploaded image of a room and to virtually paint the room based on the detected edges, walls, and surfaces. The paint your place application enables a user to paint an image uploaded to a device. FIG. 1. illustrates a schematic diagram of a system in which a remote device 22 may access a website 24. In a non-limiting example, the remote device 22 may include a smart phone, a tablet, a kiosk inside a store, a computer, or other computing device having at least a memory and processor and that can access the website 24 over the internet 28. More specifically, a user may utilize a camera of the remote device 22 to capture an image 26, such as an image of a room that the user would like to paint. The image 26 may be transmitted to the website 24 through the internet 28. The user may interact with the website 24 over the Internet 28 via operations performed on the remote device 22. Such operations may be performed by, for example, a keyboard, a mouse, track ball, touch screen or other data entry means. In such a manner, various links presented on the remote device 22 may be selected by various point and click, point and touch, or other selection operations.

The website 24 may process the image 26 using image data, web pages, paint tools, and color databases to create a colorized image 30. The colorized image 30 may be transmitted from the website 24 to the remote device 22 using the Internet 28. In some embodiments, the website's 24 functionality may be implemented in software stored on a computer readable storage medium or media and executed by a suitable computing device. For example, the suitable device may be one or more digital processors or computers, which may comprise part of a web server or other suitable computing apparatus.

With reference to FIGS. 2-14, a method 50 for executing the paint your plaint application of the present disclosure is provided. At 100 and with reference to FIGS. 3 and 4, the method 50 includes acquiring and validating the image 26. At step 102 and with reference to FIGS. 5-13, the method 50 includes pre-processing the image 26. At step 104 and with reference to FIG. 14, the method 50 includes processing the image 26. In other words, the functionality encapsulated at 100 is described in further detail below with reference to FIGS. 3 and 4. The functionality encapsulated at 102 is described in further detail below with reference to FIGS. 5-13. The functionality encapsulated at 104 is described in further detail below with reference to FIG. 14.

Figure 3:
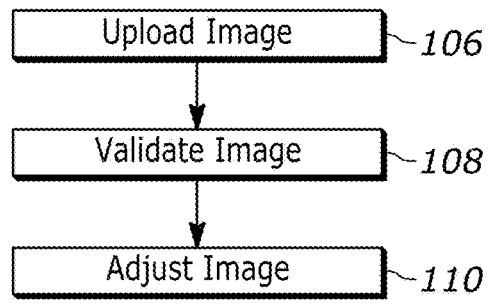
FIG. 3 is a flow chart detailing a step for acquiring and validating an image.
Figure 4:
FIG. 4 is an example image of a living room.

Step 100 will now be described in further detail. As shown in FIG. 3, step 100 includes uploading the image 26 at 106, validating the image 26 at 108, and adjusting the image 26 at 110. The image 26 may be of a scene having at least one wall, such as a room within a house or other building that the user would like to paint. For example, the scene may be an interior space of a building. As shown in FIG. 4, the interior space may include a living room having a wall 112, a ceiling 114, and a floor 116. In other examples, the scene may be of an exterior of a building.

At 106, an acquisition server may prompt the user to upload the image 26. The image 26 may be retrieved from a photo library on the remote device 22. Alternatively, the image 26 may be captured using the remote device 22. For example, the image 26 may be captured using a camera of a smart phone. At 108, validating the image may include determining whether the image 26 meets a threshold. In one example, a Laplacian blur detection may be used to detect blurs in the image 26. The paint your place application may determine whether the image 26 meets a threshold for image quality. If the image 26 does not meet the threshold, the paint your place application may notify the user that the image 26 is not of sufficient quality. However, other modes of detection and validating the image may be available. At 110, adjusting the image 26 may be conducted automatically by the paint your place application or manually by the user. Examples of the adjustment may include cropping the image 26, modifying an angle of the image 26, zooming in or out on the image 26, and modifying a placement of the image 26. More specifically, cropping the image 26 includes trimming a side of the image 26. Modifying an angle of the image 26 includes rotating the image 26 in small increments (i.e., approximately 5 degrees) and large increments (i.e., approximately 90 degrees). Modifying a placement of the image 26 includes repositioning or re-centering the image 26. However, other modes of adjusting the image to prepare the image for further processing may also be used. After step 110, the modified image 26 is referred to as a validated image.

Figure 5:
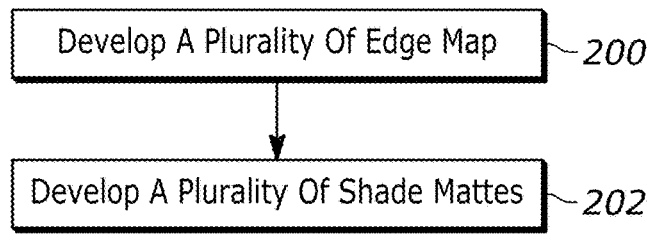
FIG. 5 is a flow chart detailing a step for pre-processing the image.
Figure 6:
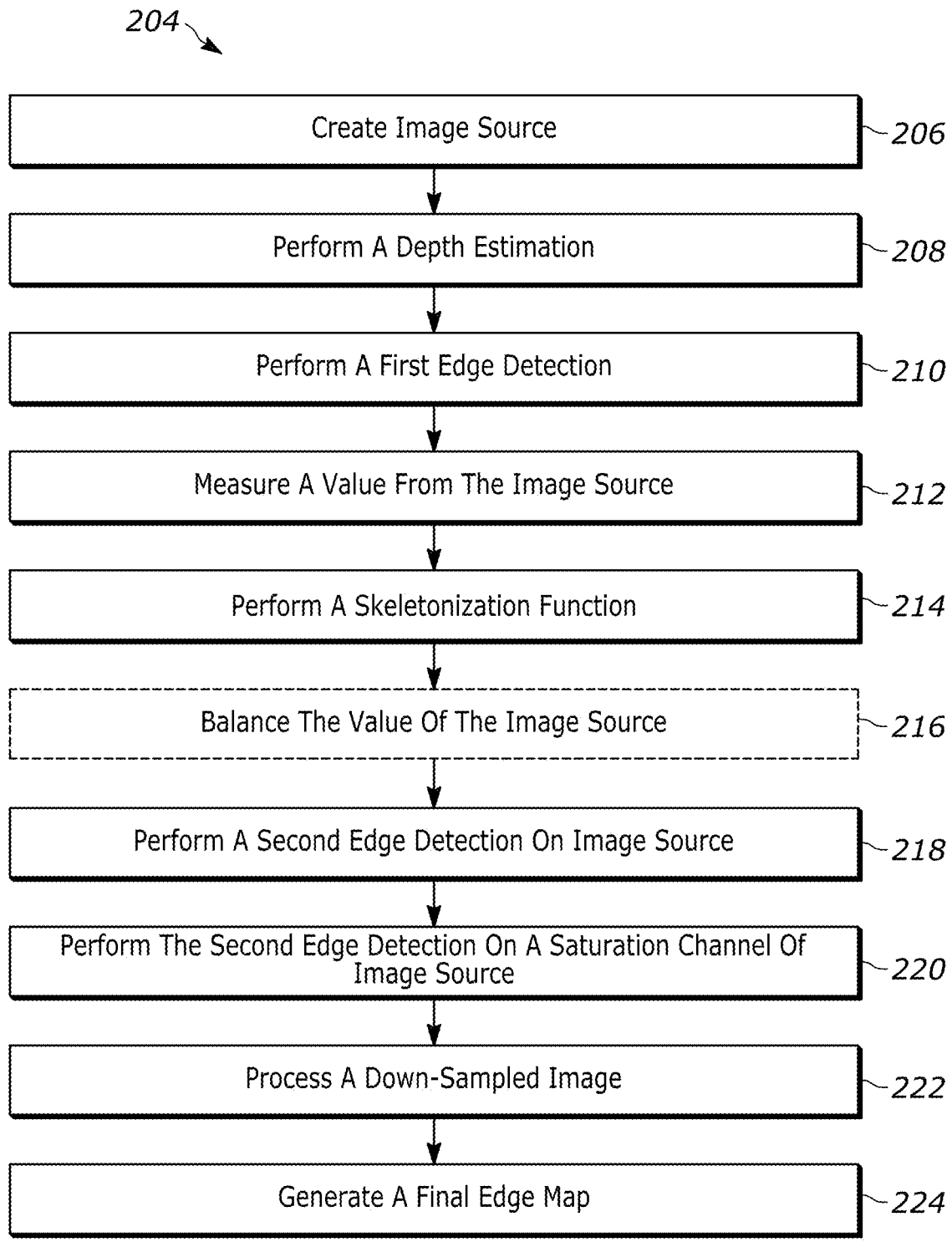
FIG. 6 is a flow chart of a method for developing a plurality of edge maps.

Referring to FIG. 5, step 102 will now be explained in greater detail. Pre-processing the validated image may include developing a plurality of edge maps at 200 and developing a plurality of shade mattes at 202. With reference to FIG. 6-10, a method 204 is provided for developing the plurality of edge maps.

At 206, the method 204 includes creating an image source. More specifically, a resolution of the validated image is modified to create the image source. In one example, the resolution of the validated image is scaled to a resolution less than or equal to 900 pixels by 1600 pixels. In another example, the resolution of the validated image is scaled to a resolution less than or equal to 900 pixels by 1600 pixels. However, the resolution of the validated image can be scaled down to any resolution.

Figure 7:
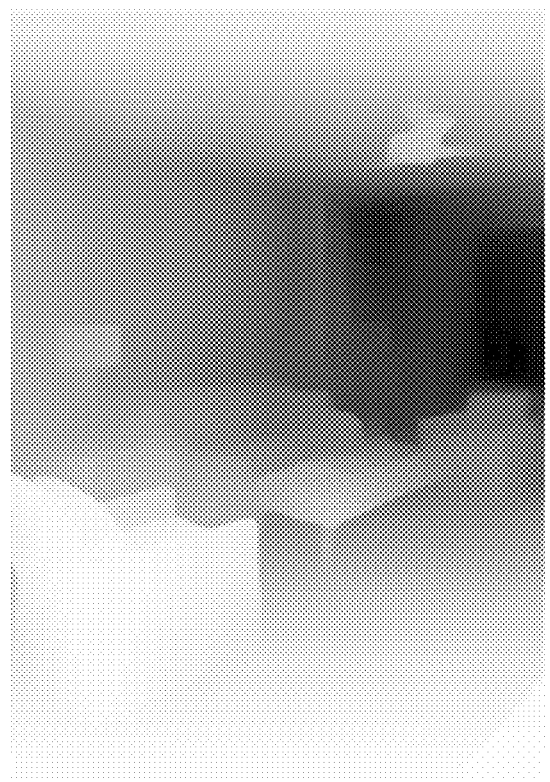
FIG. 7 is an example of a depth map for the image provided in FIG. 4.
Figure 8:
FIG. 8 is an example of a holistically-nested edge detected (HED) map for the image provided in FIG. 4.
Figure 9:
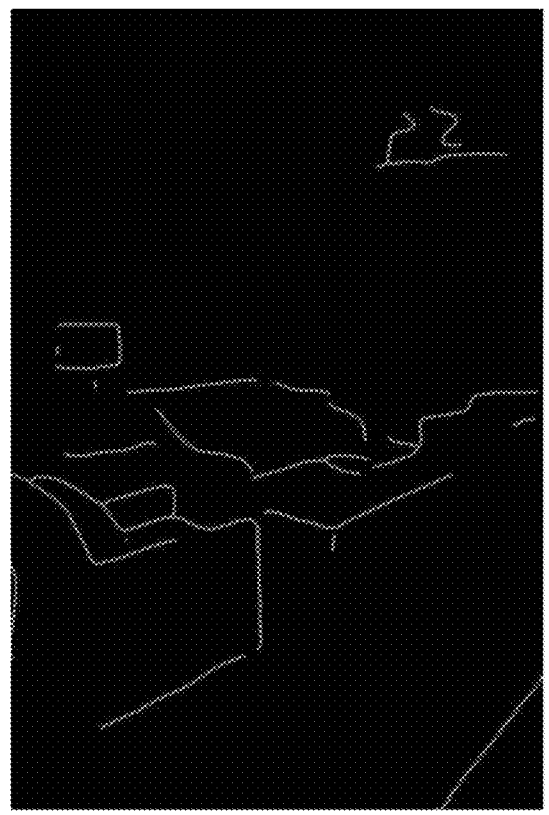
FIG. 9 is an example of a HED map using the depth map of FIG. 7.

At 208, the method 204 includes performing a depth estimation on the image source to generate a depth map. In one example, the depth estimation may include a MiDas model. FIG. 7 provides an example of a depth map using the MiDas model. The depth map of FIG. 7 is generated using an image source derived from the image in FIG. 4. As shown, a depth map utilizes shadows and gray scaling to represent the varying depths of the living room.

At 210, the method 204 includes performing a first edge detection on the image source to generate a first edge map and performing the first edge detection on the depth map to generate a second edge map. The first edge detection may be performed using any edge detector. In one example, the first edge detection may be performed using a raw holistically-nested edge detector (HED). In some embodiments, the HED may include a DexiNed model. An example of the first edge map generated using the DexiNed model is provided in FIG. 8. As shown, the first edge detection extracts a first set of edge lines such that some of the first set of edge lines outline the wall 112 of the living room. Additionally, an example of the second edge map generated using the DexiNed model is provided in FIG. 9. As shown, the first edge detection extracts the edge lines from the depth map such that a second set of edge lines is provided.

At 212, the method 204 includes measuring at least one value from the image source. More specifically, step 212 includes measuring a value of each pixel of the image source and averaging the values of each pixel together to define the at least one value. The at least one value may include a brightness value, a contrast value, or both the brightness and the contrast values. In some embodiments, measuring the at least one value of the image source can be performed using "OpenCV" and/or "Pillow" libraries of programming functions. However, any other suitable programming library or language can be used to implement the functionality of the present disclosure.

At 214, the method 204 includes performing a skeletonization function on the first edge map to generate a third edge map and performing the skeletonization function on the depth map to generate a fourth edge map. The skeletonization function thins a width of each edge line in the edge maps. For example, the edge line of the first map may be in a wide chalk-like line and using the skeletonization function, the edge line of the third edge map may be a single pixel wide line. In some embodiments, the skeletonization function is performed using a model from "Skimage." Accordingly, an example model from "Skimage" is provided below:

```
from skimage.morphology import skeletonize
from skimage import data
import matplotlib.pyplot as plt
from skimage.util import invert
#Invert the living room image
image=invert(data.livingroom( ))
#perform skeletonization
skeleton=skeletonize(image)
#display results
fig, axes=plt.subplots(nrows=1, ncols=2, figsize=(8, 4),
    sharex=True, sharey=True)
ax=axes.ravel( )
ax[0].imshow(image, cmap=plt.cm.gray)
ax[0].axis('off')
ax[0].set_title('original', fontsize=20)
ax[1].imshow(skeleton, cmap=plt.cm.gray)
ax[1].axis('off')
ax[1].set_title('skeleton', fontsize=20)
fig.tight_layout( )
plt.show( )
```

At 216, the method 204 may optionally include balancing a color of the image source using the value measured in step 212. Balancing the color of the image source is performed to improve the edge detection performance in subsequent steps. In one example, balancing the color of the image source may be performed if the image source is determined to be dark according to the brightness value. In another example, balancing the color of the image source may be performed to equalize a histogram of the image. In some embodiments, balancing the color is performed with "OpenCV." In one example, step 216 may be performed directly after step 212. In other example, step 212 may be directly before step 214. Nonetheless, step 212 is performed before step 214.

At 218, the method 204 includes performing a second edge detection on the image source to generate a fifth edge map. The second edge detection may be performed using any edge detector. In one example, the second edge detection may be performed using a canny edge detection with the "OpenCV" library of programming functions. Using the canny edge detection, edges lines in the fifth edge map may be a single pixel wide line. Performing the second edge detection includes grayscaling the image source, reducing the resolution of the image source to slightly blur the image source, and processing the image source through a plurality of edge detections. Grayscaling the image source may include transforming the color of the image source from RGB to greyscale. Additionally, reducing the resolution of the image source is beneficial in eliminating any false positive edge lines.

At 220, the method 204 includes performing the second edge detection on a saturation channel of the image source to generate a sixth edge map. Step 220 may be identical to step 218 with the exception of performing the second edge detection on the saturation channel of the image source, instead of on the grayscale of the image source.

At 222, the method 204 includes processing a down-sampled image. The down-sampled image is generated by down-sampling the image source. Processing the down-sampled image includes performing the second edge detection on the down-sampled image to generate an edge map, up-sampling the edge map to generate an up-sampled edge map, and performing the skeletonization function on the up-sampled edge map to generate a seventh edge map. By down-sampling the image source to generate the down-sampled image, adjacent pixels of the image source conform with one another. Accordingly, edges in the image source become more defined. A down-sampled image is beneficial when performing the second edge detection because the second edge detection can more easily detect the edges within the down-sampled image.

For example, an image of a living room may include a wall and ceiling painted in a white color. Accordingly, an edge between the wall and ceiling may appear in a grey color in the image. Performing the second edge detection on the image may not detect the edge between the wall and ceiling as a real edge, and instead, may treat the edge as a shadow because of its grey color. However, when the image is down-sampled, the pixels representing the edge between the wall and ceiling conform and therefore, the edge becomes more defined. Accordingly, when the second edge detection is performed on the down-sampled image, the edge between the wall and ceiling is more easily detected and generated in an edge map.

Figure 10:
FIG. 10 is an example final edge map for the image provided in FIG. 4.

At 224, the method 204 includes generating a final edge map. In some embodiments, the final edge map may be any of the third, fourth, fifth, sixth, and seventh edge maps. In other embodiments, the final edge map may be generated by layering the third, fourth, fifth, sixth, and seventh edge maps, or any combination of the third, fourth, fifth, sixth, and seventh edge maps. Layering a greater number of edge maps to generate the final edge map increases the accuracy of the edge map. FIG. 10 provides an example of a final edge map prepared according to method 204 for the image shown in FIG. 4. The final edge map of FIG. 10 is generated using the third, fourth, fifth, sixth, and seventh edge maps. Thus, the edge map is shown to be highly accurate when compared to the image shown in FIG. 4.

Figure 11:
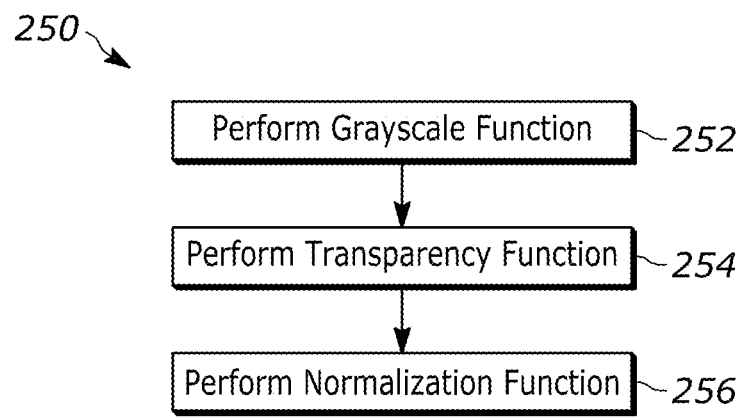
FIG. 11 is a flow chart of a method for developing a plurality of shade mattes.
Figure 12:
FIG. 12 is an example of a raw grayscale image of the image of FIG. 4.
Figure 13:
FIG. 13 is an example of a re-gray image of the image of FIG. 4.

Step 202 will now we described in greater detail. With reference to FIG. 11-13, a method 250 for developing the plurality of shade mattes is provided. At 252, the method 250 includes performing a grayscale function on the image source to generate a grayscale image. The grayscale function includes gray-scaling the image source to generate a preliminary grayscale image. More specifically, gray-scaling the image source is a conversion of an RBG pixel value to a single value ranging from 1 to 255, where the single value of 1 represents a black color and the single value of 255 represents a white color. Additionally, the grayscale function defines a maximum threshold value and a minimum threshold value. The grayscale function determines whether a value of the pixels in the preliminary grayscale image is greater than the maximum threshold value and whether the value of the pixels in the preliminary grayscale image is less than a minimum threshold value. If the value of a pixel in the preliminary grayscale image exceed the minimum and maximum threshold values, the value of the pixel is adjusted to generate the grayscale image. In adjusting the value of the pixels that exceed the minimum and maximum threshold values, the grayscale function is removing contrast from the preliminary grayscale image. Removing contrast has the benefit of reducing a harshness of shadows for the grayscale image.

At 254, the method 250 includes performing a transparency function on the image source to generate an alpha gray image. The transparency function converts a value of the pixels of the image source such that a dark color is converted to value representing an opaque appearance and a light color is converted a value representing transparency. For example, a shadow in the image source may be converted to a opaque region and a highlight in the image source may be converted to a transparent region.

At 256, the method 250 includes performing a normalization function on the image source to generate a re-gray image. The normalization function includes measuring a color value of each pixel in the image source, determining a dominant color of the image source, and adjusting the color value of the pixels to return a smaller set of RGB colors. In some embodiments, a KMeans algorithm from Skimage is used for determining the dominant color of the image source. More specifically, the KMeans algorithm can be called, for example, as follows:

class sklearn.cluster.KMeans(n_clusters=8, *, init='k-means++', n_init=10, max_iter=300, tol=0.0001, verbose=0, random_state=None, copy_x-True, algorithm='lloyd')

Additionally, the normalization function includes measuring a brightness value of each pixel in the image source and determining a mean brightness and measuring a contrast value of each pixel in the image source and determining a mean contrast. The normalization function is operable to detect contours within the image source and includes adjusting the brightness and contrast values of the pixels representing the contours using the mean brightness and mean contrast. FIG. 12 provides an example of a standard grayscale image and FIG. 13 provides an example of a re-gray image according to step 256 for the image shown in FIG. 4. As shown, the re-gray image of FIG. 13 allows for a more favorable gray-scaled image to colorize in subsequent steps.

Figure 14:
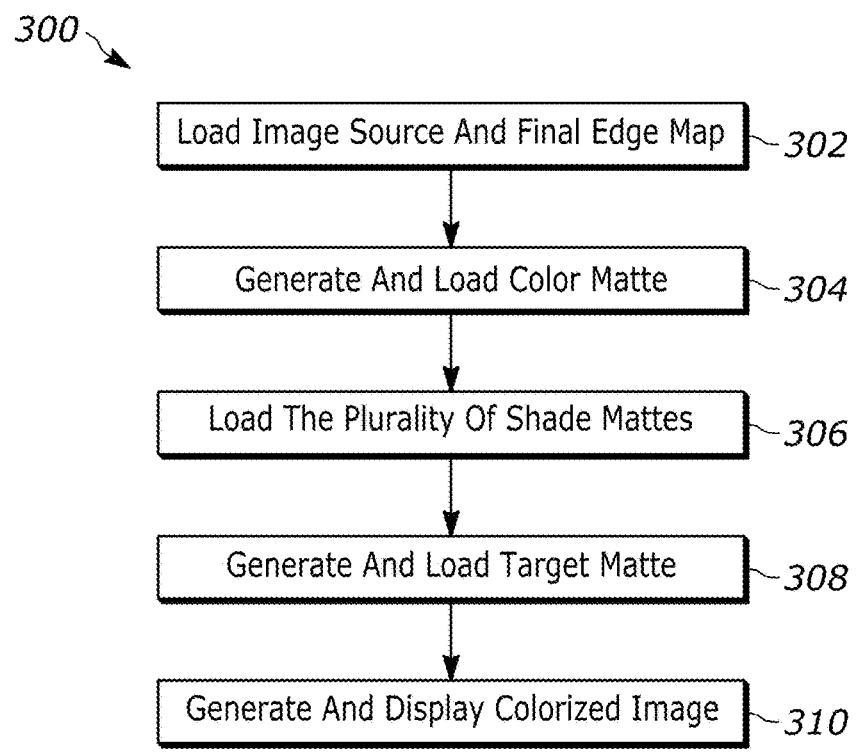
FIG. 14 is a flow chart of a method step for processing the image.

Step 104 will now be described in further detail. As shown in FIG. 14, a method 300 for processing the image is provided. At 302, the method 300 includes loading the image source and final edge map in HTML/Javascript. The final edge map may be the final edge map generated in step 224. In some embodiments, a final edge may be located off screen and a duplicate of the final edge map may be located on screen, such that the final edge map on screen is responsive to inputs from a user. Advantageously, the final edge map off screen can be utilized without losing fidelity and creating gaps in the edges due to loss of edge lines.

At 304, the method 300 includes generating and loading a plurality of color mattes in HTML/Javascript. The plurality of color mattes may include a color matte for each color available. The color mattes may be interchangeable such that one color can be replaced in all locations with a different color.

At 306, the method 300 includes loading the plurality of shade mattes in HTML/Javascript. The plurality of shade mattes may include the preliminary grayscale image generated in step 252, the grayscale image generated in step 252, the alpha gray image generated in step 254, and the re-gray image generated in step 256.

At 308, the method 300 includes generating and loading a target matte in HTML/Javascript. Generating the target matte may include combining the final edge map and the plurality of shade mattes such that shading is applied to the final edge map.

At 310, the method 300 includes generating and displaying a colorized image. More specifically, a user may interact with the remote device 22 to apply a color to a selected region of the target matte. The selected region may include a region outlined in the final edge map. In some examples, the user may apply a color to an interior wall of a building, such as a wall in a living room. In other examples, the user may apply a color to an exterior wall of a building. Generating the colorized image may include applying the color matte below or above the final edge map and below or above the plurality of shade mattes in order to provide a realistic appearance. Additionally, the displaying the colorizing image may include displaying the colorized image on a display of the remote device 22.

Advantageously, the method 50 for the paint your place application allows the customer to digitally visualize a scene with a new paint color applied to one or more walls of the scene. Additionally, the method 50 minimizes the number of inputs required by the customer by automating the generation of edge maps and shade mattes for an efficient and reliable method that provides a high-resolution and high-definition demarcation of detected walls, edges, and surfaces within an uploaded image to produce a realistic visualization of the room that can be virtually pained with different paint colors selected by the user so that the user can visualize how the room will look once it is painted with the selected colors.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A, B, and C should be construed to mean a logical (A OR B OR C), using a non-exclusive logical OR, and should not be construed to mean "at least one of A, at least one of B, and at least one of C." The term subset does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method for enabling a user to paint an image uploaded to a device, the method comprising:
    uploading an image to the device, wherein the image is of a scene having at least one wall;
    performing a depth estimation on the image to generate a depth map;
    performing an edge detection on the image to generate a first edge map, wherein the first edge map includes a first set of edge lines of the scene outlining the at least one wall;
    performing the edge detection on the depth map to generate a second edge map, wherein the first edge map includes a second set of edge lines of the scene;
    performing a skeletonization function on the first edge map to generate a third edge map, wherein the skeletonization function thins a width of each edge line in the first set of edge lines;
    performing the skeletonization function on the depth map to generate a fourth edge map;
    generating a final edge map using the third edge map and the fourth edge map;
    generating a colorized image by applying color to the final edge map to paint the at least one wall; and
    displaying the colorized image on a display of the device.

2. The method of claim 1, further comprising validating the image before performing the depth estimation, wherein the validating includes determining whether the image meets a threshold for image quality.

3. The method of claim 1, further comprising adjusting the image before performing the depth estimation, wherein the adjusting includes at least one of cropping the image, modifying an angle of the image, zooming in or out of the image, and modifying a placement of the image.

4. The method of claim 1, further comprising scaling the image before performing the depth estimation, wherein the scaling includes adjusting a resolution of the image to a maximum resolution.

5. The method of claim 4, wherein the maximum resolution is one of 1600 pixels by 900 pixels or 900 pixels by 1600 pixels.

6. The method of claim 1, wherein performing the edge detection includes performing a raw holistically-nested edge detection (HED).

7. The method of claim 1, further comprising:
    performing a canny edge detection on the image to generate a fifth edge map;
    performing the canny edge detection on a saturation channel of the image to generate a sixth edge map; and
    wherein the generating the final edge map is using the third, fourth, fifth and sixth edge maps.

8. The method of claim 1, further comprising:
    down-sampling the image to generate a down-sampled image;
    performing a canny edge detection on the down-sampled image to generate an edge map;
    up-sampling the edge map to generate an up-sampled edge map;
    performing the skeletonization function on the up-sampled edge map to generate a seventh edge map; and
    wherein the generating the final edge map is using the third, fourth, and seventh edge maps.

9. A method for enabling a user to paint an image uploaded to a device, the method comprising:
    uploading an image to the device, wherein the image is of a scene having at least one wall;
    performing a depth estimation on the image to generate a depth map;
    performing a first edge detection on the image to generate a first edge map, wherein the first edge map includes a first set of edge lines of the scene outlining the at least one wall;
    performing the first edge detection on the depth map to generate a second edge map, wherein the second edge map includes a second set of edge lines of the scene;
    performing a skeletonization function on the first edge map to generate a third edge map, wherein the skeletonization function thins a width of each edge line in the first set of edge lines;
    performing the skeletonization function on the depth map to generate a fourth edge map;
    performing a second edge detection on the image to generate a fifth edge map;
    performing the second edge detection on a saturation channel of the image to generate a sixth edge map;
    generating a final edge map using the third edge map, the fourth edge map, the fifth edge map, and the sixth edge maps;
    generating a colorized image by applying color to the final edge map to paint the at least one wall; and
    displaying the colorized image on a display of the device.

10. The method of claim 9, wherein performing the first edge detection includes performing a raw holistically-nested edge detection (HED).

11. The method of claim 9, wherein performing the second edge detection includes performing a canny edge detection.

12. The method claim 9, further comprising measuring a first value of a brightness and a second value of a contrast of the image, and balancing a color of the image using the first and second values.

13. The method of claim 9, further comprising:
    down-sampling the image to generate a down-sampled image;
    performing a canny edge detection on the down-sampled image to generate an edge map;
    up-sampling the edge map to generate an up-sampled edge map;
    performing the skeletonization function on the up-sampled edge map to generate a seventh edge map; and
    wherein the generating the final edge map is using the third, fourth, fifth, sixth, and seventh edge maps.

14. A method for enabling a user to paint an image uploaded to a device, the method comprising:
  uploading an image to the device, wherein the image is of a scene having at least one wall, and the scene includes at least one shadow and at least one highlight;
  performing a depth estimation on the image to generate a depth map;
  performing an edge detection on the image to generate an edge map, wherein the edge map includes an outline of the at least one wall;
  generating a final edge map using the depth map and the edge map;
  performing a grayscale function on the image to generate a grayscale image;
  performing a transparency function on the image to generate an alpha gray image, wherein the alpha gray image represents the at least one shadow as an opaque region and represents the at least one highlight as a transparent region;
  performing a normalization function on the image to generate a re-gray image, wherein the normalization function includes measuring one or more values of at least one pixel of the image and normalizing the one or more values;
  generating a colorized image by applying a color to the final edge map and using the grayscale image, alpha gray image and re-gray image; and
  displaying the colorized image on a display of the device.

15. The method of claim 14, wherein performing the grayscale function includes gray scaling the image to generate a preliminary grayscale image and adjusting a value of at least one pixel of the preliminary grayscale image to generate the grayscale image.

16. The method of claim 14, wherein the normalization function further includes determining a dominant color value of the image and the value includes a color value, wherein normalizing the color values of image uses the dominant color value.

17. The method of claim 14, wherein the normalization function further includes detecting a contour in the image, and the at least one pixel represents pixels of the contour.

18. The method of claim 17, wherein the one or more values include a brightness value and a contrast value.

19. The method of claim 14, wherein generating the colorized image includes applying a color on top of the alpha gray image.

20. The method of claim 14, wherein generating the colorized image includes applying a color below the alpha gray image.

21. A system comprising a computing device having a processor and a memory configured to:
  receive an image uploaded to the computing device, wherein the image is of a scene having at least one wall,
  perform a depth estimation on the image to generate a depth map,
  perform an edge detection on the image to generate a first edge map, wherein the first edge map includes a first set of edge lines of the scene outlining the at least one wall,
  perform the edge detection on the depth map to generate a second edge map, wherein the first edge map includes a second set of edge lines of the scene,
  perform a skeletonization function on the first edge map to generate a third edge map, wherein the skeletonization function thins a width of each edge line in the first set of edge lines,
  perform the skeletonization function on the depth map to generate a fourth edge map,
  generate a final edge map using the third edge map and the fourth edge map,
  generate a colorized image by applying color to the final edge map to paint the at least one wall, and
  display the colorized image on a display of the computing device.

22. The system of claim 21, wherein the computing device is further configured to validate the image before performing the depth estimation, wherein the validating includes determining whether the image meets a threshold for image quality.

23. The system of claim 21, the computing device is further configured to adjust the image before performing the depth estimation, wherein the adjusting includes at least one of cropping the image, modifying an angle of the image, zooming in or out of the image, and modifying a placement of the image.

24. The system of claim 21, the computing device is further configured to scale the image before performing the depth estimation, wherein the scaling includes adjusting a resolution of the image to a maximum resolution.

25. The system of claim 24, wherein the maximum resolution is one of 1600 pixels by 900 pixels or 900 pixels by 1600 pixels.

26. The system of claim 21, wherein the computing device is further configured to perform the edge detection by performing a raw holistically-nested edge detection (HED).

27. The system of claim 21, the computing device is further configured to:
  perform a canny edge detection on the image to generate a fifth edge map, and
  perform the canny edge detection on a saturation channel of the image to generate a sixth edge map;
  wherein generating the final edge map is using the third, fourth, fifth and sixth edge maps.

28. The system of claim 21, the computing device is further configured to:
  down-sample the image to generate a down-sampled image,
  perform a canny edge detection on the down-sampled image to generate an edge map,
  up-sample the edge map to generate an up-sampled edge map, and
  perform the skeletonization function on the up-sampled edge map to generate a seventh edge map;
  wherein generating the final edge map is using the third, fourth, and seventh edge maps.

29. A system comprising a computing device having a processor and a memory configured to:
  receive an image uploaded to the computing device, wherein the image is of a scene having at least one wall,
  perform a depth estimation on the image to generate a depth map,
  perform a first edge detection on the image to generate a first edge map, wherein the first edge map includes a first set of edge lines of the scene outlining the at least one wall,
  perform the first edge detection on the depth map to generate a second edge map, wherein the second edge map includes a second set of edge lines of the scene,
  perform a skeletonization function on the first edge map to generate a third edge map, wherein the skeletonization function thins a width of each edge line in the first set of edge lines,
  perform the skeletonization function on the depth map to generate a fourth edge map, perform a second edge detection on the image to generate a fifth edge map, perform the second edge detection on a saturation channel of the image to generate a sixth edge map, generate a final edge map using the third edge map, the fourth edge map, the fifth edge map, and the sixth edge maps, generate a colorized image by applying color to the final edge map to paint the at least one wall, and display the colorized image on a display of the computing device.

30. The system of claim 29, wherein the computing device is further configured to perform the first edge detection by performing a raw holistically-nested edge detection (HED).

31. The system of claim 29, wherein the computing device is further configured to perform the second edge detection by performing a canny edge detection.

32. The system of claim 29, wherein the computing device is further configured to measure a first value of a brightness and a second value of a contrast of the image, and to balance a color of the image using the first and second values.

33. The system of claim 29, wherein the computing device is further configured to:

down-sample the image to generate a down-sampled image, perform a canny edge detection on the down-sampled image to generate an edge map, up-sample the edge map to generate an up-sampled edge map, and perform the skeletonization function on the up-sampled edge map to generate a seventh edge map;

wherein generating the final edge map is using the third, fourth, fifth, sixth, and seventh edge maps.

34. A system comprising a computing device having a processor and a memory configured to:

receive an image uploaded to the computing device, wherein the image is of a scene having at least one wall, and the scene includes at least one shadow and at least one highlight, perform a depth estimation on the image to generate a depth map, perform an edge detection on the image to generate an edge map, wherein the edge map includes an outline of the at least one wall, generate a final edge map using the depth map and the edge map, perform a grayscale function on the image to generate a grayscale image, perform a transparency function on the image to generate an alpha gray image, wherein the alpha gray image represents the at least one shadow as an opaque region and represents the at least one highlight as a transparent region, perform a normalization function on the image to generate a re-gray image, wherein the normalization function includes measuring one or more values of at least one pixel of the image and normalizing the one or more values, generate a colorized image by applying a color to the final edge map and using the grayscale image, alpha gray image and re-gray image, and display the colorized image on a display of the computing device.

35. The system of claim 34, wherein the computing device is further configured to perform the grayscale function by gray scaling the image to generate a preliminary grayscale image and to adjust a value of at least one pixel of the preliminary grayscale image to generate the grayscale image.

36. The system of claim 34, wherein the computing device is further configured to perform the normalization function further by determining a dominant color value of the image and the value includes a color value, wherein normalizing the color values of image uses the dominant color value.

37. The system of claim 34, wherein the computing device is further configured to perform the normalization function further by detecting a contour in the image, and the at least one pixel represents pixels of the contour.

38. The system of claim 37, wherein the one or more values include a brightness value and a contrast value.

39. The system of claim 34, wherein the computing device is further configured to generate the colorized image includes by applying a color on top of the alpha gray image.

40. The system of claim 34, wherein the computing device is further configured to generate the colorized image includes applying a color below the alpha gray image.

* * * * *